United States Patent
Brignone et al.

(10) Patent No.: US 10,527,357 B2
(45) Date of Patent: Jan. 7, 2020

(54) FEED EFFLUENT HEAT EXCHANGER

(71) Applicant: Lummus Technology Inc., Bloomfield, NJ (US)

(72) Inventors: Vincenzo Marco Brignone, Leiden (NL); Richard Jibb, Bloomfield, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 179 days.

(21) Appl. No.: 15/654,527

(22) Filed: Jul. 19, 2017

(65) Prior Publication Data
US 2018/0023897 A1 Jan. 25, 2018

Related U.S. Application Data

(60) Provisional application No. 62/364,112, filed on Jul. 19, 2016.

(51) Int. Cl.
*F28D 7/16* (2006.01)
*F28F 9/22* (2006.01)
*F28F 1/10* (2006.01)

(52) U.S. Cl.
CPC ......... *F28D 7/1646* (2013.01); *F28D 7/1607* (2013.01); *F28D 7/1623* (2013.01);
(Continued)

(58) Field of Classification Search
CPC .... F28F 9/22; F28F 2009/226; F28F 2230/00; F28D 7/06; F28D 7/16; F28D 7/1607
See application file for complete search history.

(56) References Cited

U.S. PATENT DOCUMENTS

| | | | | |
|---|---|---|---|---|
| 1,672,650 A | * | 6/1928 | Lonsdale | F28F 9/22 165/160 |
| 6,581,510 B2 | * | 6/2003 | Koch | A23G 3/04 165/145 |

(Continued)

FOREIGN PATENT DOCUMENTS

| | | | | |
|---|---|---|---|---|
| JP | 59170697 A | * | 9/1984 | F28F 9/22 |
| JP | 05231793 A | * | 9/1993 | |

*Primary Examiner* — Eric S Ruppert
(74) *Attorney, Agent, or Firm* — Locke Lord LLP; Scott D. Wofsy; Christopher J. Capelli

(57) ABSTRACT

Disclosed is a shell and tube heat exchanger that includes, inter alia, an elongated cylindrical shell that defines a longitudinal axis for the heat exchanger and an internal chamber. The shell has at least one feed gas inlet and feed gas outlet formed in an outer wall for allowing a feed gas to enter and exit the internal chamber. At least one tube sheet is associated with an end of the elongated shell and a plurality of circular baffles are longitudinally spaced apart within the internal chamber of the shell for redirecting feed gas flow within the internal chamber. The heat exchanger also includes a tube bundle which has a plurality of tubes for allowing effluent gas to traverse from an inlet plenum through the internal chamber of the shell to an outlet plenum. Additionally, a shroud distributor is arranged and configured to direct feed gas flow from the feed gas inlet to the internal chamber proximate the at least one tube sheet. The shroud distributor has at least one angled cut formed in an end thereof for distributing the flow of feed gas.

28 Claims, 9 Drawing Sheets

(52) U.S. Cl.
CPC .................. *F28F 1/10* (2013.01); *F28F 9/22* (2013.01); *F28F 2009/226* (2013.01)

(56) References Cited

U.S. PATENT DOCUMENTS

| | | | | |
|---|---|---|---|---|
| 2004/0249203 | A1* | 12/2004 | Yada | B01J 8/06 |
| | | | | 562/545 |
| 2005/0161204 | A1* | 7/2005 | Johnston | F28D 7/16 |
| | | | | 165/162 |

* cited by examiner

FEED EFFLUENT HEAT EXCHANGER

CROSS-REFERENCE TO RELATED APPLICATIONS

This application claims priority to U.S. Provisional Patent Application Ser. No. 62/364,112, filed Jul. 19, 2016, entitled Feed Effluent Heat Exchanger which is incorporated herein by reference in its entirety.

FIELD OF THE INVENTION

The present disclosure is directed to heat exchangers, and more particularly to, shell and tube heat exchangers with improved heat exchange effectiveness.

BACKGROUND

Many processes for the production of petrochemicals require a gaseous feed to be heated to high temperature prior to carrying out a reaction. Some examples are dehydrogenation of ethylbenzene to form styrene monomer, and dehydrogenation of propane or butane to form butenes or butadiene. A significant amount of fuel must be burned in a fired heater to generate the required temperatures for the feed gas. The excess heat in the reactor effluent may be recovered as steam. However, in many cases this energy conversion from fuel to steam is not the most economical option and it is desirable to recover as much of the heat as possible in a feed effluent heat exchanger in order to minimize the amount of fuel consumed by the process.

Conventional heat exchanger methods and systems have generally been considered satisfactory for their intended purpose. However, there is still a need in the art for systems and methods that provide for improved and more thermally efficient shell and tube heat exchangers.

SUMMARY OF THE DISCLOSURE

The present disclosure is directed to heat exchanger constructions with improved heat exchange effectiveness. A first embodiment of the present disclosure is a shell and tube heat exchanger that includes, inter alia, an elongated cylindrical shell that defines a longitudinal axis for the heat exchanger and an internal chamber. The shell has at least one feed gas inlet and feed gas outlet formed in an outer wall for allowing a feed gas to enter and exit the internal chamber. In certain constructions, the shell includes two or more feed gas inlets and two or more feed gas outlets.

At least one tube sheet is associated with an end of the elongated shell and a plurality of circular baffles are longitudinally spaced apart within the internal chamber of the shell for redirecting feed gas flow within the internal chamber. In certain constructions, a circumferential seal is associated with each of the plurality of baffles.

A tube bundle is provided which includes a plurality of tubes for allowing effluent gas to traverse from an inlet plenum through the internal chamber of the shell to an outlet plenum. The heat exchanger further includes a first shroud distributor that is arranged and configured to direct feed gas flow from the feed gas inlet into the internal chamber proximate the at least one tube sheet. The first shroud distributor has at least one angled cut formed in an end thereof for distributing the flow of feed gas.

In certain embodiments of the present invention, two feed gas inlets and two feed gas outlets are formed in the outer wall of the shell. Preferably, in such constructions, the first shroud distributor has two angled cuts formed in an end thereof for distributing the flow of feed gas. In certain constructions the angled cuts are positioned 180 degrees apart.

It is envisioned that the at least one shroud distributor can include at least one circular baffle. In a preferred embodiment, the shroud distributor includes a donut style baffle having a central window area. In certain constructions that the shroud distributor furthers includes a shield style baffle having a circumferential sealing element.

It is envisioned that the at least one angled cut formed in the end of the at least one shroud distributer is formed at an angle of 10-30 degrees.

In a preferred construction that heat exchanger further includes a second shroud distributor that has at least one angled cut formed in an end thereof and arranged and configured to direct feed gas flow from the internal chamber to the feed gas outlet.

It is envisioned that in embodiments of the present invention, the plurality of baffles includes both shield style baffles and wing style baffles which are arranged in alternating pattern.

Preferably, each of the circumferential seals associated with each of the plurality of circular baffles includes a flexible element which extends between the baffle and the shell. It is envisioned that the flexible element can be provided on a single side of the baffle or on both sides of the baffle.

In certain embodiments, the plurality of circular baffles includes at least one shield style baffle formed by cutting two diametrically opposed windows into a baffle plate. Additionally, the plurality of circular baffles can include at least one wing style baffle formed by cutting a single window into a baffle plate. Still further, the plurality of circular baffles can include a donut style baffle formed by cutting a circular window into a baffle plate.

The present disclosure is further directed to a shell and tube heat exchanger that includes, among other elements, an elongated cylindrical shell that defines a longitudinal axis for the heat exchanger and an internal chamber. The shell has at least one feed gas inlet and feed gas outlet formed in an outer wall for allowing a feed gas to enter and exit the internal chamber. At least one tube sheet is associated with an end of the elongated shell and a plurality of circular baffles are longitudinally spaced apart within the internal chamber of the shell for redirecting feed gas flow within the internal chamber, the plurality of baffles including shield style baffles and wing style baffles and each baffle includes a circumferential seal. The heat exchanger further includes a tube bundle which includes a plurality of tubes for allowing effluent gas to traverse from an inlet plenum through the internal chamber of the shell to an outlet plenum. Moreover, a first shroud distributor is arranged and configured to direct feed gas flow from the feed gas inlet to the internal chamber proximate the at least one tube sheet, the first shroud distributor having at least one angled cut formed in an end thereof for distributing the flow of feed gas.

It is presently envisioned that the first shroud distributor has two angled cuts formed in an end thereof which are positioned 180 degrees apart for distributing the flow of feed gas. In certain constructions the at least one shroud distributor includes at least one circular baffle. Moreover, the shroud distributor can include a donut style baffle having a central window area.S Still further, the shroud distributor can further include a shield style baffle having a circumferential sealing element.

In is envisioned that the at least one angled cut formed in the end of the at least one shroud distributer can be formed at an angle of 10-30 degrees.

In certain preferred embodiments, the heat exchanger further includes a second shroud distributor that has at least one angled cut formed in an end thereof and is arranged and configured to direct feed gas flow from the internal chamber to the feed gas outlet.

Preferably, the plurality of shield style baffles and wing style baffles are arranged in alternating pattern.

In is envisioned that the circumferential seal associated with each of the plurality of baffles includes a flexible element which extends between the baffle and the shell. In certain constructions, the flexible element is provided on both sides of the baffle.

The shield style baffles can be formed by cutting two diametrically opposed windows into a baffle plate. The wing style baffles can be formed by cutting a single window into a baffle plate. Additionally, the donut style baffles are formed by cutting a circular window into a baffle plate.

The disclosure is further directed to a shell and tube heat exchanger which includes, inter alia, an elongated cylindrical shell that defines a longitudinal axis for the heat exchanger and an internal chamber. The shell has at least one feed gas inlet and feed gas outlet formed in an outer wall for allowing a feed gas to enter and exit the internal chamber. At least one tube sheet is associated with an end of the elongated shell. A plurality of circular baffles are longitudinally spaced apart within the internal chamber of the shell for redirecting feed gas flow within the internal chamber, the plurality of baffles including a flexible circumferential seal extending between the baffle and the shell. The heat exchanger further includes a tube bundle which includes a plurality of tubes for allowing effluent gas to traverse from an inlet plenum through the internal chamber of the shell to an outlet plenum. Additionally, the heat exchanger includes a first shroud distributor that is arranged and configured to direct feed gas flow from the feed gas inlet to the internal chamber proximate the at least one tube sheet, the first shroud distributor having at least one angled cut formed in an end thereof for distributing the flow of feed gas.

Preferably, a flexible element is provided on both sides of the baffle. It is envisioned that the flexible element can be made from stainless steel such as stainless 304.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures.

Figure 1A:
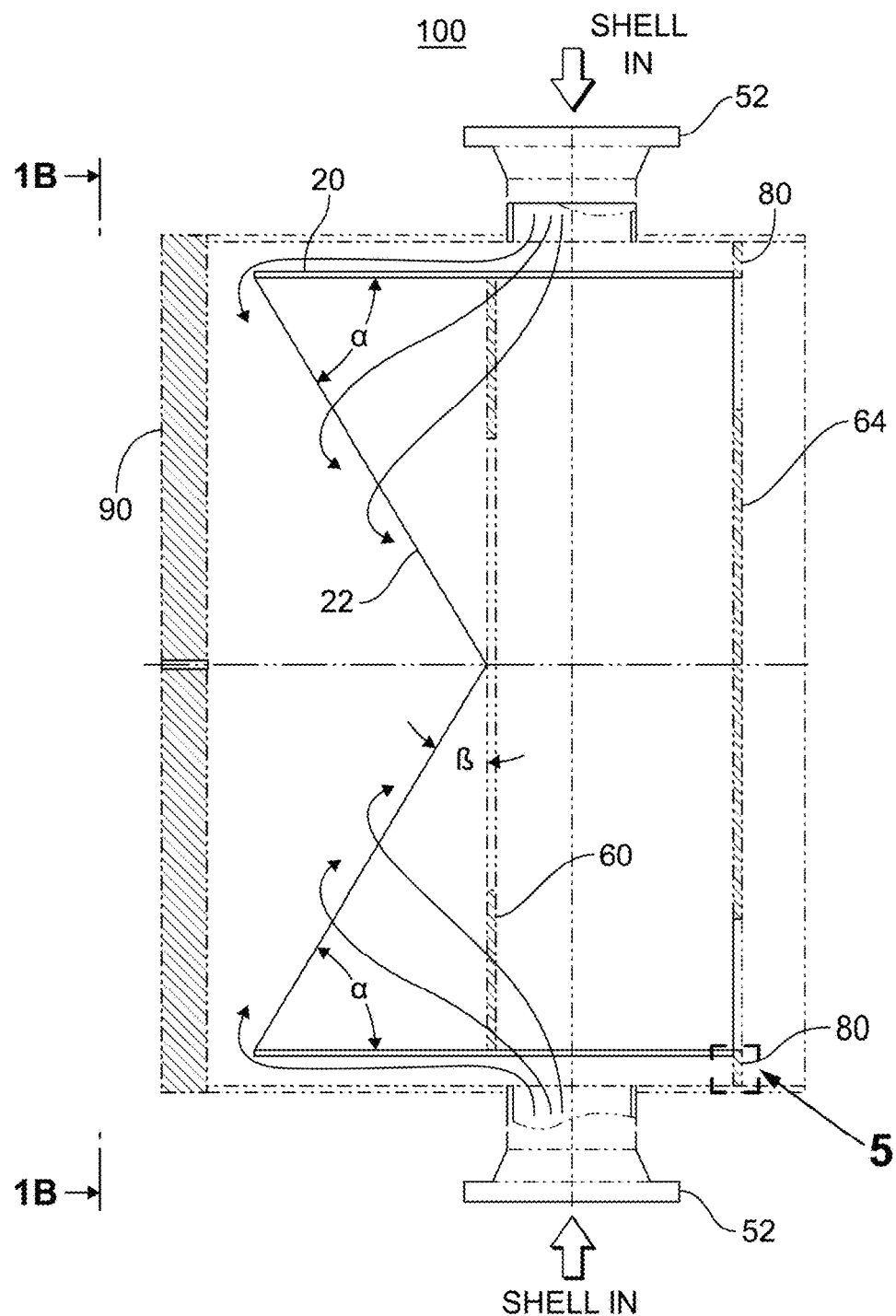
FIG. 1A shows a elevational view of an exemplary shroud type distributor with an angled cut and a donut style baffle which has been constructed in accordance with an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment These and other aspects of the subject disclosure will become more readily apparent to those having ordinary skill in the art from the following detailed description of the invention taken in conjunction with the drawings.

DETAILED DESCRIPTION

Reference will now be made to the drawings wherein like reference numerals identify similar structural features or aspects of the subject disclosure. It will be understood that the disclosed embodiments are merely examples of the way in which certain aspects of the invention can be implemented and do not represent an exhaustive list of all of the ways the invention may be embodied. Indeed, it will be understood that the systems, devices and methods described herein may be embodied in various and alternative forms. Moreover, the figures are not necessarily to scale and some features may be exaggerated or minimized to show details of particular components.

Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Unless otherwise apparent, or stated, directional references, such as "right," "left," "upper," "lower," "outward," "inward," etc., are intended to be relative to the orientation of a particular embodiment of the invention as shown in the first numbered view of that embodiment.

Typically, a heat exchanger should have a very high efficiency. The required efficiency is normally expressed in terms of heat exchange "effectiveness" which is defined as the heat transferred from the cooling fluid to the warming fluid as a percentage of the maximum possible heat recovery. In some cases there are additional constraints or requirements. For example, the Catofin™ process for dehydrogenation of propane or propane butane combinations requires that the reaction is carried out under a reduced pressure so the pressure loss of the gas must be kept as low as possible to maintain a high selectivity.

Shell and tube type heat exchangers are desirable for these applications because they can be constructed to allow for thermal expansion of the components due to the large temperature ranges involved. An exemplary shell and tube construction includes a fixed tube sheet at one end and a floating head tube sheet at the other end. Unfortunately, shell and tube heat exchangers can suffer from poor distribution of fluid on the shell side due to leakage of fluid around the tubes and baffles. This maldistribution leads to two undesirable effects. Firstly, the thermal effectiveness is limited by the fact that cold fluid mixes with fluid that has been heated and secondly the tube sheet temperature may not be uniform which can lead to warping or buckling and subsequent tube damage. Even distribution is especially important at the inlet and outlet regions where the tube sheet must be maintained at a relatively uniform temperature to prevent warping or buckling. Similarly, the individual tubes or groups of tubes must be maintained at a relatively uniform temperature in the different sections of the heat exchanger to ensure that there is no damage due to differential thermal expansion.

The feed effluent heat exchanger described in embodiments herein can be a gas-gas heat exchanger of a shell and tube type construction wherein a low temperature feed at 20° C.-100° C. is fed to the shell side and the high temperature effluent (e.g., 400° C.-600° C.) is fed to the tube side. More generally, it applies to a heat exchanger where one or both of the fluids change temperature by more than 200° C. and preferably more than 300° C. in one single exchange.

In the example of a feed effluent heat exchanger used in the Catofin™ process, hot effluent gas is assigned to the tube side so that the pressure drop can be very low. However, the low pressure drop also leads to a large number of tubes across which the shell side fluid must be evenly distributed making the heat exchanger design problem particularly challenging.

Embodiments of the present disclosure, as applied to the Catofin feed effluent heat exchanger construction, represent highly effective gas-gas tubular feed effluent heat exchangers that are used to heat reactor feed (usually propane or butane or a combination thereof) against reactor effluent in a dehydrogenation process whereby the exchanger has a very high effectiveness (90% or more) and a very low pressure drop of the effluent gas, e.g., 6 kilopascal (kPa) or less.

Existing baffle technology used in FEHE applications include conventional segmental baffles which can be single, segmental, double segmental or NTIW. Other conventional baffle technology includes disk and donut baffles which are slid onto the tube bundle.

Conventional flow distribution methods at the exchanger inlet that are used in shell & tube heat exchangers include controlling the flow by means of impingement devices such as rods or plates. However, whilst such a design may prevent tube damage due to vibration it does not provide improved use of the inlet and outlet regions in the cases with large shell ID nor is it suitable for a high effectiveness heat exchanger in which fluid distribution is critical to performance. Moreover, when the high operating temperature requires uniform temperature at the tubesheet to shell joint to avoid thermal distortion and localized stresses, conventional rod or plate type impingement devices are unsatisfactory since they tend to promote high local temperature gradients between the bundle area close to the nozzles and the areas at 90 degrees from the nozzles.

Existing annular distributor designs include an annular section that is outside the shell and does not ensure uniform distribution all along the circumference. In addition, the mechanical design becomes more complicated with such an arrangement, especially for large shell ID and high pressure exchangers.

Advantageously, as will be discussed in detail below, certain heat exchanger embodiments disclosed herein use circular baffles with window portions cut out of each baffle such that axial flow between the shell interior and tube bundle is prevented at every baffle. Moreover, in certain embodiments disclosed herein circumferential sealing assemblies are installed in the annular gap between the baffle and shell, which reduces the occurrence of mechanical discontinuities that can create local regions of concentrated stress.

Embodiments herein provide for heat exchanger designs in which all of the shell side fluid flow is uniformly directed over the tube sheet such that the tube sheet temperature variation is minimized. In addition, the baffle layout used in embodiments herein prevents fluid from bypassing the tube bundle by leaking between the tube bundle and shell in the window areas and between the baffle and shell, due to the adoption of circumferential sealing at every baffle. A high effectiveness (e.g., >90%) is achieved and maintained by preventing fluid from bypassing the tube bundle, but surprisingly this combination has been found to provide a particularly effective design, with heat transfer effectiveness greater than 90% and temperature variation across the tube sheet less than 15° C. even for a large shell diameter of 3 meters. Prior art solutions were limited to <90% effectiveness with a tube sheet temperature variation of about 100° C. because fluid which bypasses the tube bundle and flows from inlet to outlet is much colder and will tend to cool the outer periphery of the tube sheet thereby leading to thermal stress. As a result, these prior art solutions were not satisfactory use in processes such as the Catofin™ process. The circumferential sealing baffle design described herein reduces thermal stress which could lead to mechanical failure because this bypass is prevented. Advantageously, heat exchanger embodiments described herein allow for higher heat recovery (90%+) and reduce temperature variations throughout the heat exchanger that can lead to thermal stresses and eventual tube failure.

The temperature distribution for the presently disclosed heat exchangers is remarkably uniform compared to other methods, with less than 15° C. temperature variation across the tube sheet. This unexpected good performance is attributed to the equalization of flow resistance between the shell inlet nozzle and the center of the bundle, regardless of fluid path, and is further enhanced by the circumferential sealing that can be provided at every baffle. As used herein, "circumferential sealing" may refer to the combination of the baffle window construction (which blocks axial flow between the tubes and the shell) and the "E-stream sealing" which blocks axial flow between the baffles and the shell.

Figure 1B:
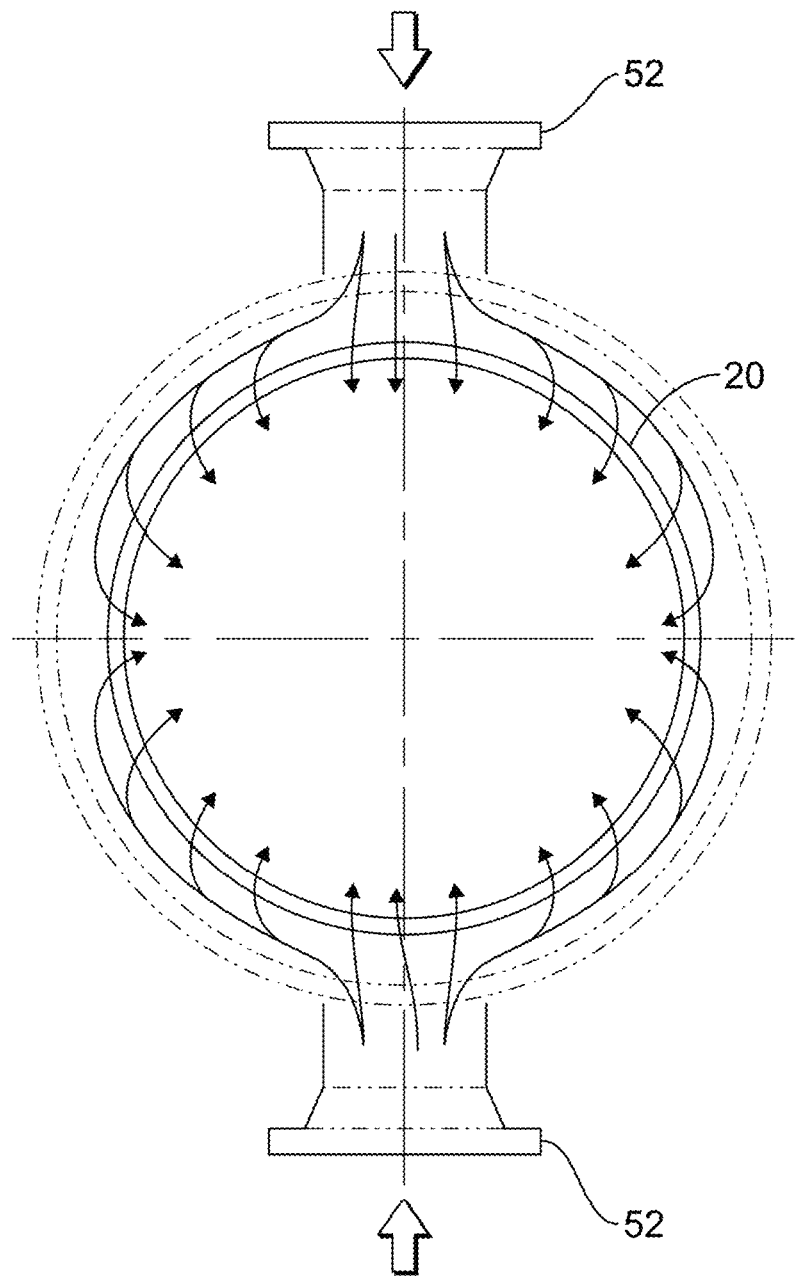
FIG. 1B shows a cross-sectional view of the shroud type distributor of FIG. 1A.

Referring now to the figures, wherein FIG. 1A shows an exemplary embodiment of shroud type distributor 20 which has been constructed in accordance with an embodiment of the present invention for use in a heat exchanger 100. FIG. 1B provides a cross-sectional view taken at an end of heat exchanger 100 along line A-A. Heat exchanger 100 is a shell and tube heat exchanger with two inlet nozzles 52 and two outlet nozzles 54 for the shell side fluid, the shell fluid can be heated by the tube side fluid. Those skilled in the art will readily appreciate that the inventive aspects of the present disclosure can be applied to various heat exchanger designs and are not limited to feed-effluent heat exchangers. For example, the heat exchanger can include a single shell inlet and a single shell outlet. Additionally, the heat exchanger can have a U-shaped tube bundle.

In the case of a Catofin™ feed-effluent heat exchanger, the shell side fluid is the feed and the tube side fluid is the hot reactor effluent. The purpose of the feed-effluent exchanger is to transfer at least 90% of the available thermal energy from the effluent gas to the feed gas. The tube side pressure drop must be very low to maintain selectivity of the reaction. This results in a large number of tubes and consequently a relatively low shell side velocity which is not conducive to good flow distribution. Similarly, since a high effectiveness is required >90%, good distribution is essential since if a significant portion of cold feed gas bypasses the tubes and mixes with warm gas at the outlet it is impossible to achieve the required effectiveness due to the thermodynamic inefficiency of mixing cold gas with warm gas.

Embodiments herein use double segmental style baffles with window zones cut from a circular plate, whereby circumferential sealing is preferably provided at every baffle.

Figure 2A:
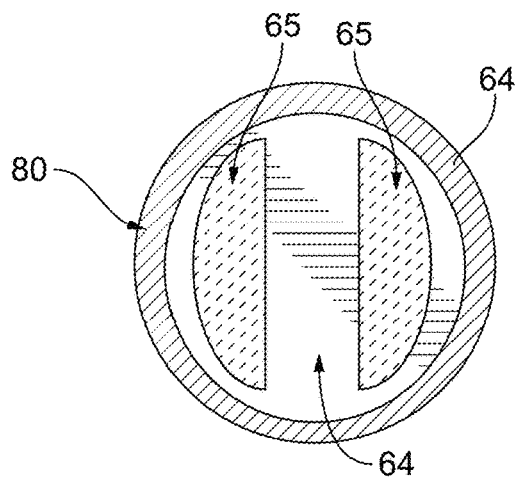
FIG. 2A shows a schematic view of an exemplary shield baffle constructed in accordance with the present disclosure, wherein two windows are cut from the circular baffle.
Figure 2B:
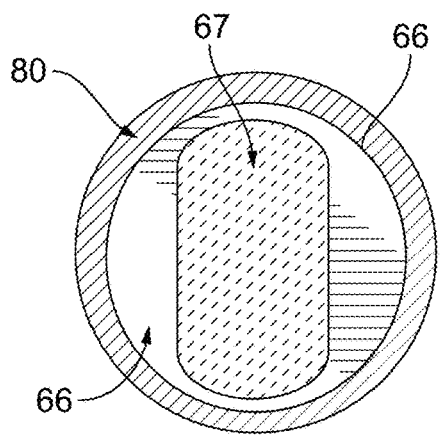
FIG. 2B shows a schematic view of exemplary wing baffle constructed in accordance with the present disclosure, wherein one window is cut from the circular baffle.
Figure 2C:
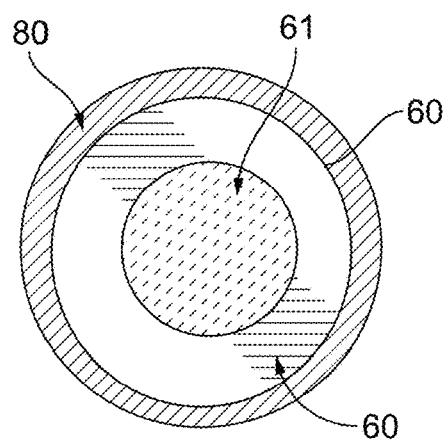
FIG. 2C shows a schematic view of yet another exemplary circular baffle constructed in accordance with the present disclosure, with a circular portion removed from the circular baffle creating a donut style baffle.

FIGS. 2A-2C show exemplary circular baffles which can be used in the heat exchanger embodiments disclosed herein. FIG. 2A shows a first type of circular baffle, a shield baffle 64, with two segmental windows 65 cut out at the top and the bottom of the plate (or opposed sides depending on plate orientation). The segmental windows 65 may be semi-circular in shape as shown in FIG. 2A or other shapes depending upon the application. To seal the baffle to shell gap, circumferential sealing 80 is used at the periphery of the shield baffle shown in FIG. 2A.

FIG. 2B show a second type of circular baffle, a wing baffle 66, with a single segmental window 67 cut out from the center of the circular baffle. The single segmental window 67 may be rectangular, oblong, or any other suitable shape. In this case, circumferential sealing 80 is applied at the periphery of the circular baffle.

FIG. 2C shows a third type of circular baffle, a donut baffle 60, with a single circular section 61 cut out in the center. Circumferential sealing 80 is also used with this baffle arrangement to avoid E-stream leakage. E-stream leakage may refer to the flow that leaks between the baffles and the shell. In certain embodiments, the donut style baffle 60 of FIG. 2C may have a non-circular hole and/or the hole may be positioned off-center. For example, a hole may be cut in the shape of a circle but with segments removed.

Figure 3:
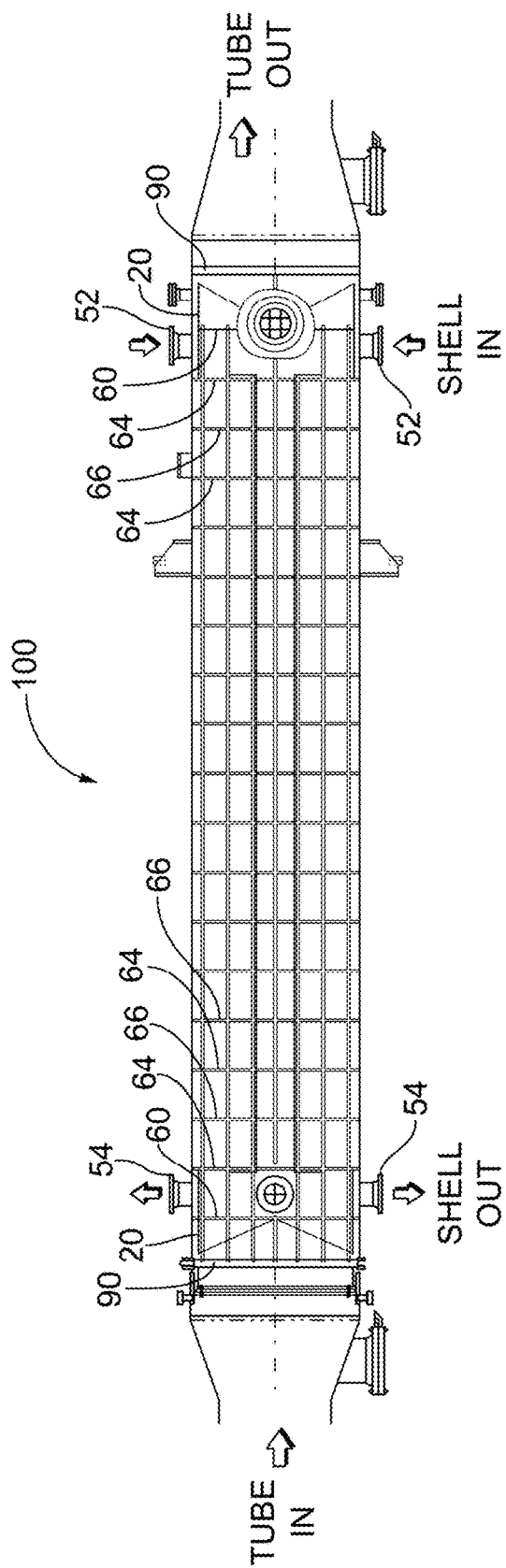
FIG. 3 shows a schematic view of an exemplary heat exchanger layout which has been constructed in accordance with an embodiment of the present disclosure.

FIG. 3 shows an exemplary heat exchanger according to an embodiment of the present invention disclosed herein. As shown in FIG. 3, heat exchanger 100 can use two sets of circular baffles, the first set can be a shield type baffle 64 as shown in FIG. 2A having two segmental windows 65 cut out at the top and the bottom, and the second set of baffles can be wing type baffles 66 as shown in FIG. 2B having a single segmental window 67 cut out from the center of the circular baffle. The two types of baffles can be placed alternately along the heat exchanger while the tubes are supported through holes drilled in the baffles. The third baffle type, a donut style baffle 60 such as that shown in FIG. 2C, can be used at the location closest to the tube sheet 90 at either end of the heat exchanger 100.

Heat exchanger 100 described herein also includes a shroud distributor 20 (e.g., a cylindrical shroud). The shroud distributor 20 has two diametrically opposed angle section cut outs 22 as best shown in FIG. 1A. Shroud distributor 20 is placed around the tube bundle and can extend from donut shield baffle 64 to a point between the outlet/inlet nozzle 54/52 and the tube sheet 90. The angled sections 22 are cut from the cylindrical shroud 20 such that the flow resistance from the center of the bundle to the inlet 52 is similar regardless of the fluid path. The angle β can be from approximately 10°-30°, such that the flow resistance from the inlet nozzle 52 to the center of the donut baffle 60 is equal along all paths between the inlet nozzle 52 and the center of the tube bundle. For example, β can be about 10, 11, 12, 13, 14, 15, 16, 17, 18, 19, 20, 21, 22, 23, 24, 25, 26, 27, 28, 29 or about 30 degrees. In the embodiment disclosed in FIG. 3 heat exchanger 100 includes a second shroud distributor 20 associated with the outlet end of the shell. This distributor can be constructed in the same manner as the shroud located at the inlet end and the flow resistance is likewise equal along all paths from the center of the tube bundle to the outlet nozzle 54. It will be appreciated that heat exchanger 100 can be constructed with a single inlet or outlet shroud without departing from the scope of the present invention.

As shown in FIG. 1A, a donut style baffle 60 and a shield style baffle 64 can be used to provide support for shroud 20.

It is noted that heat exchanger 100 can be provided with conventional baffles. However, the effectiveness and mechanical integrity of heat exchanger 100 is improved when the shroud distributor 20 is used in combination with the presently disclosed baffle constructions and arrangements and with circumferential sealing at every baffle location.

Figure 4:
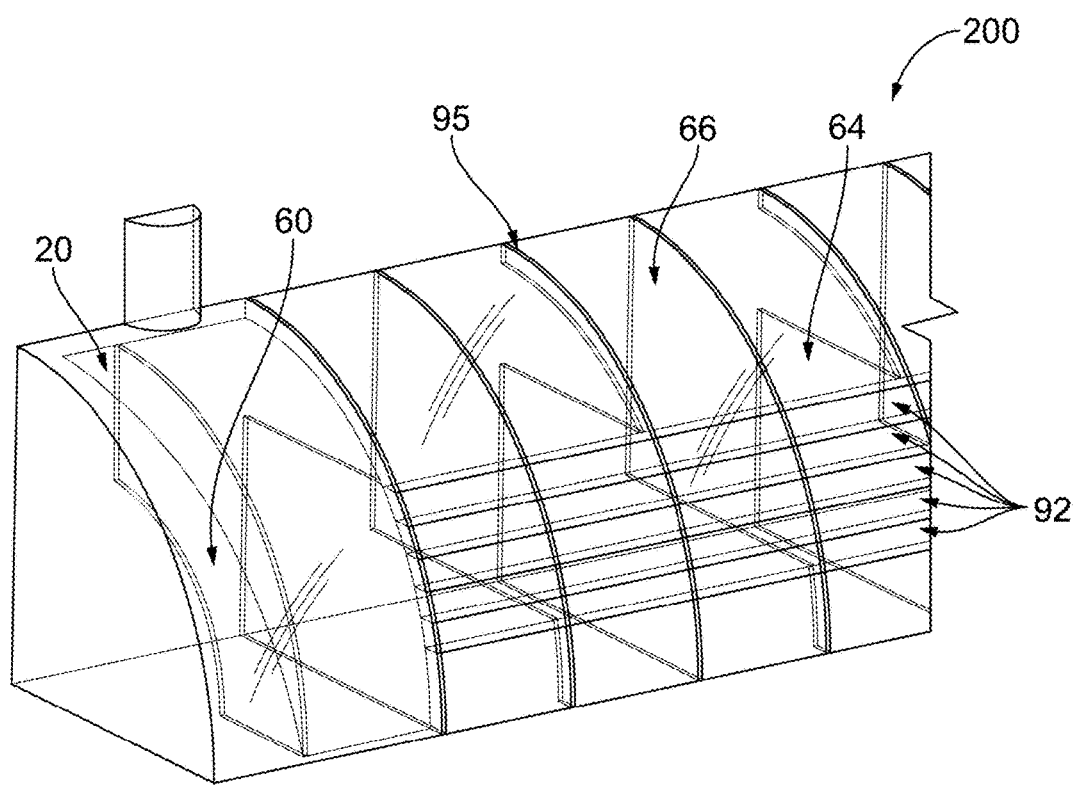
FIG. 4 provided a cross-sectional view of a quarter section of an exemplary heat exchanger that has been constructed according to a further embodiment of the present disclosure.

FIG. 4 shows a cross-sectional view of a quarter section of a heat exchanger which has been constructed in accordance with an embodiment of the present disclosure. As shown, heat exchanger 200 can include a donut baffle 60 at one end, alternating window cut baffles 64/64 as shown and described in FIGS. 2A-2C above, tube bundles 92, a shroud and "e-stream seals 95". Those skilled in the art will readily appreciate that other baffle types, such as disk and donut style baffles can be used in lieu of one or more double segmental baffle. Combinations of double segmented baffles or other baffle types are specifically contemplated.

Figure 5:
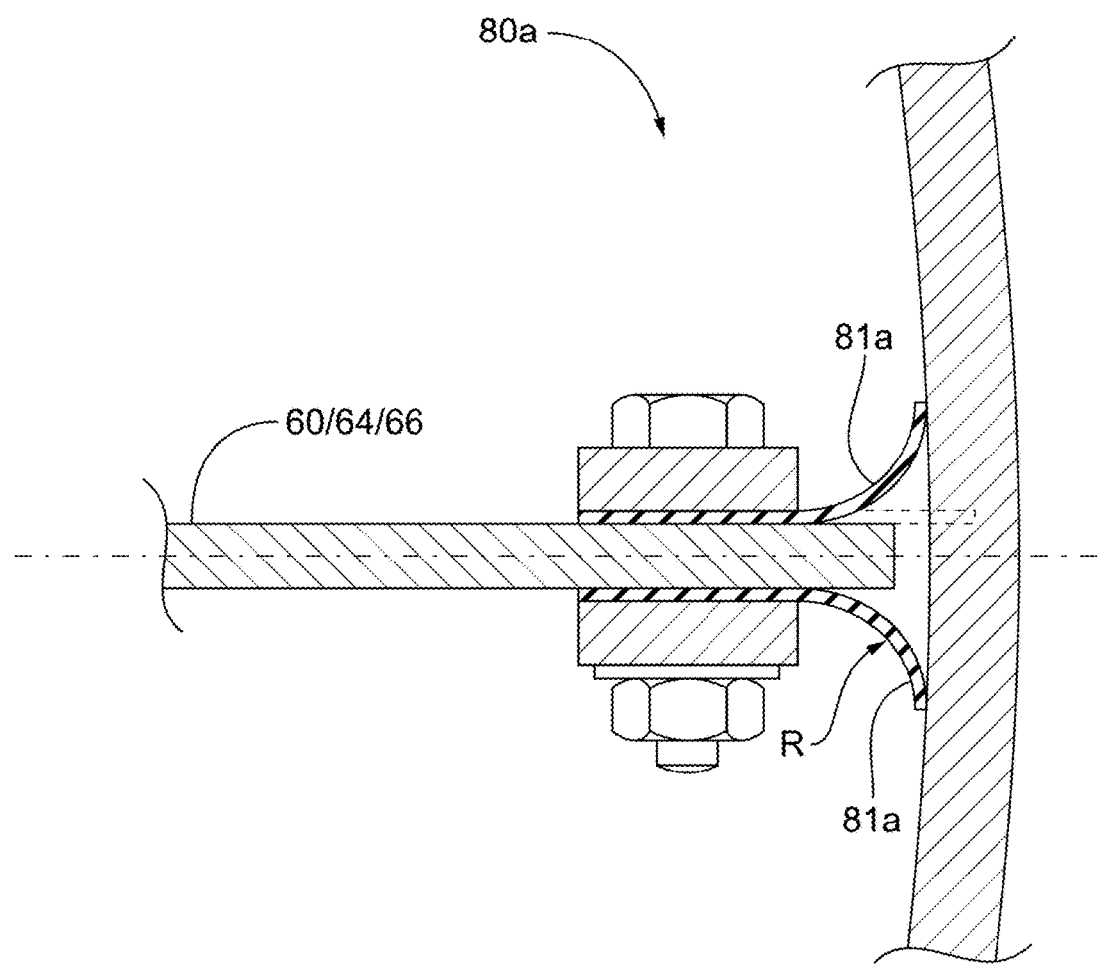
FIG. 5 shows a cross sectional view of a circumferential (e.g. E-Stream) or flexible seal arrangement for use with heat exchanger baffles.
Figure 6A:
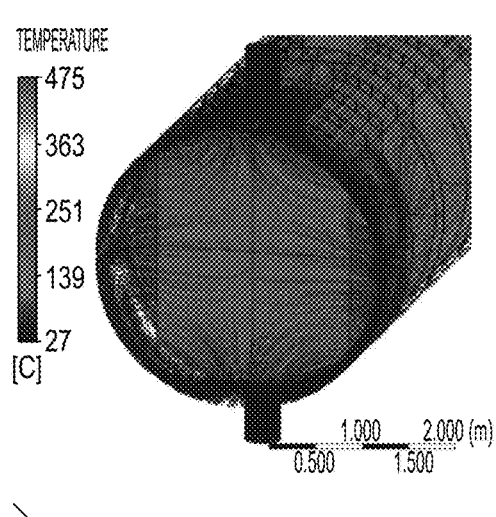
FIG. 6A is a schematic view of an exemplary temperature distribution profile at a shell inlet of an existing heat exchanger.
Figure 6B:
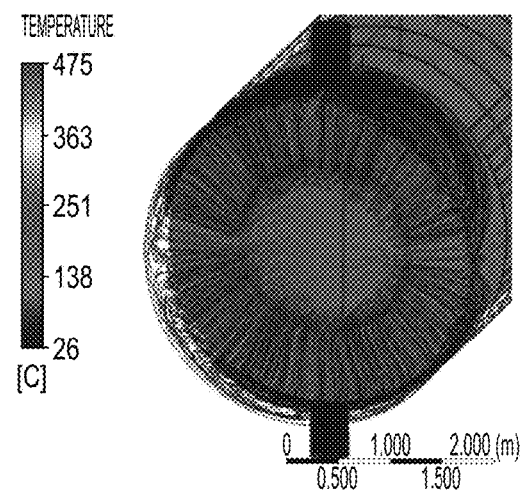
FIG. 6B is a schematic view of an exemplary temperature distribution profile at a shell inlet of a heat exchanger which is constructed in accordance with the present disclosure, adopting a reduced scale with respect to FIG. 6A.

The use of all the design features together as shown in FIGS. 1B, 2 and 5, allows an optimal flow distribution to be achieve along the entire length of the heat exchanger, mitigating the mechanical stresses caused by thermal gradients around the tube bundle. The double segmental baffles with special profile shown in FIGS. 2A and 2B, can be replaced with other kind of baffles, as dictated by the required tube support and thermal performance. Whatever baffle shape is chosen, its profile should follow the same indications valid for the double segmental baffle; i.e. windows should be cut from the baffle, blocking the axial leakage in the untubed area, and allowing the installation of the circumferential sealing all around the baffle periphery to bock the E-stream leakage. In some cases, where manufacturing allows tight baffle to shell clearance or when the anticipated E-stream leakage is marginal, circumferential sealing could be omitted.

The shroud distributors 20 are designed to make the flow distribution both at inlet and outlet as equal as possible around the entire 360 degree periphery. The optimal flow distribution is achieved equalizing the hydraulic resistances in all the directions to obtain the optimal distribution shown in FIG. 7B. In case of heat exchangers with small shell diameters and a reduced flow rate, a single inlet/outlet nozzle can be use. The longest path will be at 180° from the nozzle and not at 90° as in the case with two inlet/outlet nozzles. The flow equalization can be achieved by cutting larger windows in the distributor moving from the nozzle to the longest path, or cutting the distributor under an angle.

FIG. 5 provides a cross sectional view of a flexible seal arrangement 80a for use in embodiments herein. The circumferential sealing 80 applied to the baffles 60/64/66 herein can be enhanced using flexible interface between the baffle and the shell. The flexible seal 80a can be made with either a single or multiple layers of material, for example by using a material such as stainless steel 304 or similar. As an example, the circumferential sealing used to seal the longitudinal baffle can be similar to the T4 by Kempchen & Co. GmbH of Oberhausen, Germany or to the longitudinal seal shown in U.S. Pat. No. 4,215,745. Although, FIG. 5 shows circumferential sealing elements 81a applied to both sides of the baffle 60/64/66, sealing element 81a could be applied on one side of the baffles only. Furthermore, to avoid damages during the bundle insertion, circumferential strips 81a should be installed on the side opposite to the direction of insertion, and baffle to shell clearance should be minimized (e.g., half TEMA tolerance is preferable). The strip radius "R" shall be configured to have high flexibility and avoid permanent deformation of the strips 81a during the bundle insertion.

High recovery feed/effluent exchangers are characterized by large size shell and tube heat exchangers that are not commonly present in the industry. The most often used design software (HTRI™) is not able to reliably predict the performance of this equipment and usually over predicts thermal performance because the leakage of fluid in the spaces between the baffles and the shell is not accounted for correctly. As such, results from using HTRI™ for the design of such equipment can result in severe underperformance since a very high effectiveness (>90%) may be predicted, but not achieved in practice. Embodiments herein have been verified using CFD simulations which indicate that the thermal effectiveness can be increased by several percentage points to around 90% or higher and that the temperature variation of the tube sheet surface can be reduces to around 15° C. or less.

In the conventional heat exchanger design, flow takes the shorter path between the tubes and the shell based on the lower hydraulic flow resistance resulting in an uneven asymmetric flow profile. As a result, the temperature of the tube sheet is very uneven leading to poor effectiveness and high mechanical stresses due to thermal gradients. In the present design, due to the shroud distributor, the majority of the fluid passing through the end zone flows across the tube sheet in a uniform and symmetrical fashion such that the temperature of the tube sheet is even all of the way across. The combination of circumferential sealing at every baffle and the angled donut style distributor are desirable to produce this optimal flow pattern.

Figure 7A:
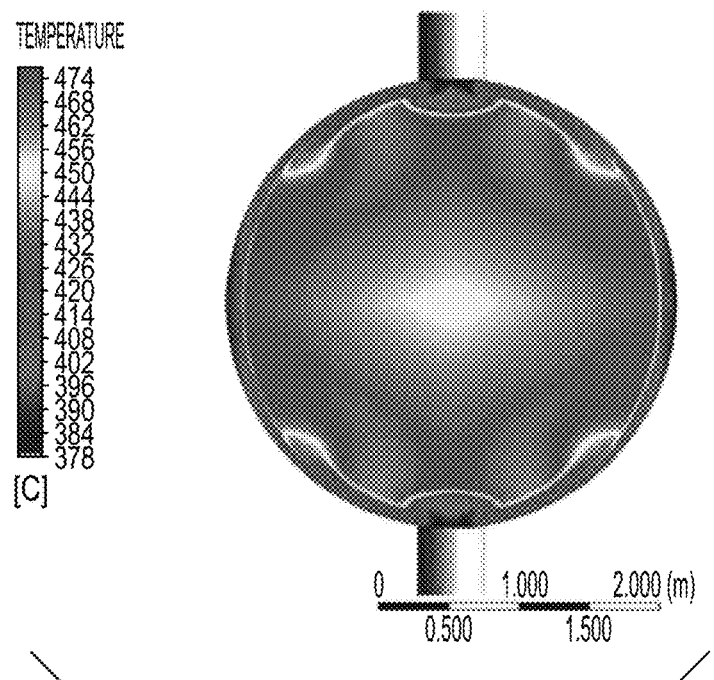
FIG. 7A is a schematic view of an exemplary temperature distribution profile at a shell outlet of an existing heat exchanger.
Figure 7B:
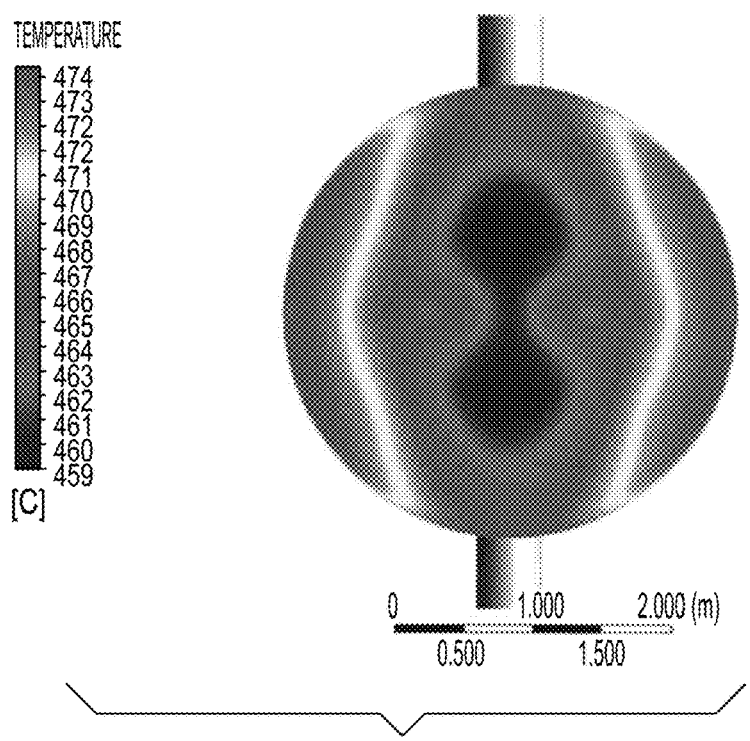
FIGS. 7B (local scale) and 7C (same scale disk) are schematic views of an exemplary temperature distribution profile at a shell outlet of a heat exchanger which is constructed in accordance with the present disclosure.
Figure 7C:
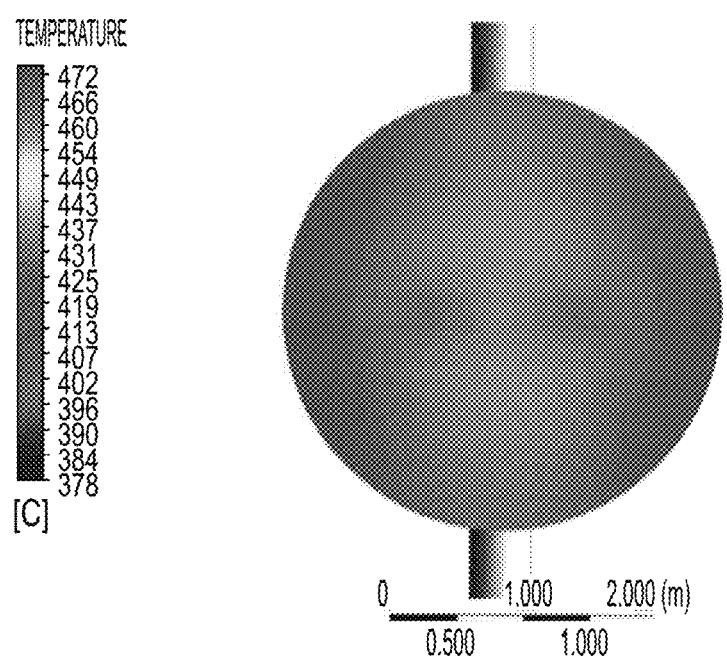

FIG. 7A shows the temperature distribution profile at an inlet of an existing heat exchanger system (top tube sheet). FIGS. 7B and 7C show temperature distributions at an inlet (top tube sheet) of a heat exchanger designed and implemented as described herein. FIG. 7B shows the temperature distribution at the inlet adopting a reduced scale with respect to FIG. 7A.

FIG. 8A is a schematic view of an exemplary temperature distribution profile at a shell outlet of an existing heat exchanger. FIGS. 8B (local scale) and 8C (same scale disk) are schematic views of an exemplary temperature distribution profile at a shell outlet of a heat exchanger which is constructed in accordance with the present disclosure.

As shown in the example case provided, the temperature range across the tube sheet is reduced from ~100° C. in the prior art heat exchanger to ~15° C. in the heat exchanger of the present invention.

It is to be noted that while embodiments herein are described with respect to a Catofin process plant, it is also contemplated that various embodiments could also be applied to any process where high heat recovery and high effectiveness is desirable and the shell side fluid is a high temperature gas. For example, Catadiene, SMART Styrene monomer manufacture, or other process such as LNG, etc are envisioned.

The methods and systems of the present disclosure, as described above and shown in the drawings, provide shell and tube heat exchangers. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A shell and tube heat exchanger comprising:
   an elongated cylindrical shell that defines a longitudinal axis for the heat exchanger and an internal chamber, the shell having two diametrically opposed feed gas inlets and at least one feed gas outlet formed in an outer wall for allowing a feed gas to enter and exit the internal chamber;
   at least one tube sheet associated with an end of the elongated shell;
   a plurality of circular baffles longitudinally spaced apart within the internal chamber of the shell for redirecting feed gas flow within the internal chamber;
   a tube bundle which includes a plurality of tubes for allowing effluent gas to traverse from an inlet plenum through the internal chamber of the shell to an outlet plenum; and
   a first cylindrical shroud distributor arranged and configured to direct feed gas flow from the two diametrically opposed feed gas inlets into the internal chamber proximate the at least one tube sheet, the first shroud distributor having a cylindrical outer surface parallel to the longitudinal axis of the cylindrical shell and an upstream edge that is angled obliquely relative to the longitudinal axis for distributing the flow of feed gas wherein the upstream edge is disposed symmetrically across a plane bisecting the cylindrical shell evenly between the two diametrically opposed feed gas inlets.

2. The heat exchanger as recited in claim 1, wherein two feed gas outlets are formed diametrically opposite one another in the outer wall of the shell.

3. The heat exchanger as recited in claim 1, wherein the first cylindrical shroud distributor includes a first circular baffle separate from the plurality of circular baffles longitudinally spaced apart within the interior chamber of the shell.

4. The heat exchanger as recited in claim 3, wherein the first circular baffle of the first shroud distributor is a donut style baffle having a central window area.

5. The heat exchanger as recited in claim 4, wherein the shroud distributor further includes a second shield style baffle separate from the plurality of circular baffles longitudinally spaced apart within the interior chamber of the shell, the second shield baffle having a circumferential sealing element.

6. The heat exchanger as recited in claim 1, wherein the upstream edge that is angled obliquely relative to the longitudinal axis is formed at an angle of 10-30 degrees relative to the longitudinal axis of the cylindrical shell.

7. The heat exchanger as recited in claim 1, further including a second cylindrical shroud distributor having a cylindrical outer surface parallel to the longitudinal axis of the cylindrical shell and a downstream edge that is angled obliquely relative to the longitudinal axis configured to direct feed gas flow from the internal chamber to the feed gas outlet wherein the downstream edge is disposed symmetrically across a plane bisecting the cylindrical shell evenly between the two diametrically opposed feed gas outlets.

8. The heat exchanger as recited in claim 1, wherein the plurality of baffles includes both shield style baffles and wing style baffles which are arranged in alternating pattern.

9. The heat exchanger as recited in claim 1, wherein a circumferential seal is associated with each of the plurality of baffles.

10. The heat exchanger as recited in claim 9, wherein the circumferential seal of each of the plurality of circular baffles and the first circular baffle of the first shroud distributor includes a flexible element which extends towards the shell.

11. The heat exchanger as recited in claim 10, wherein separate flexible elements are provided on both sides of each of the plurality of circular baffles longitudinally spaced apart within the internal chamber of the shell and the first circular baffle of the first distributor.

12. The heat exchanger as recited in claim 1, wherein the plurality of circular baffles includes at least one shield style baffle formed by cutting two diametrically opposed windows into a baffle plate.

13. The heat exchanger as recited in claim 1, wherein the plurality of circular baffles includes at least one wing style baffle formed by cutting a single window into a baffle plate.

14. The heat exchanger as recited in claim 1, wherein the plurality of circular baffles includes a donut style baffle formed by cutting a circular window into a baffle plate.

15. A shell and tube heat exchanger comprising:
an elongated cylindrical shell that defines a longitudinal axis for the heat exchanger and an internal chamber, the shell having two diametrically opposed feed gas inlets and at least one feed gas outlet formed in an outer wall for allowing a feed gas to enter and exit the internal chamber;
at least one tube sheet associated with an end of the elongated shell;
a plurality of circular baffles longitudinally spaced apart within the internal chamber of the shell for redirecting feed gas flow within the internal chamber, the plurality of baffles including shield style baffles and wing style baffles and each baffle includes a circumferential seal;
a tube bundle which includes a plurality of tubes for allowing effluent gas to traverse from an inlet plenum through the internal chamber of the shell to an outlet plenum; and
a first cylindrical shroud distributor arranged and configured to direct feed gas flow from the two diametrically opposed feed gas inlets into the internal chamber proximate the at least one tube sheet, the first shroud distributor having a cylindrical outer surface parallel to the longitudinal axis of the cylindrical shell and an upstream edge that is angled obliquely relative to the longitudinal axis a for distributing the flow of feed gas wherein the upstream edge is disposed symmetrically across a plane bisecting the cylindrical shell evenly between the two diametrically opposed feed gas inlets.

16. The heat exchanger as recited in claim 15, wherein the first cylindrical shroud distributor includes a first circular baffle separate from the plurality of circular baffles longitudinally spaced apart within the interior chamber of the shell.

17. The heat exchanger as recited in claim 16, wherein the first circular baffle of the shroud distributor is a donut style baffle having a central window area.

18. The heat exchanger as recited in claim 17, wherein the shroud distributor further includes a second shield style baffle separate from the plurality of circular baffles longitudinally spaced apart within the interior chamber of the shell, the second shield style baffle having a circumferential sealing element.

19. The heat exchanger as recited in claim 15, wherein the upstream edge that is angled obliquely relative to the longitudinal axis is formed at an angle of 10-30 degrees relative to the longitudinal axis of the cylindrical shell.

20. The heat exchanger as recited in claim 15, wherein the plurality of shield style baffles and wing style baffles are arranged in alternating pattern.

21. The heat exchanger as recited in claim 15, wherein the circumferential seal of each of the plurality of circular baffles longitudinally spaced apart within the internal chamber of the shell includes a flexible element which extends towards the shell.

22. The heat exchanger as recited in claim 21, wherein a flexible element is provided on both sides of each the plurality of circular baffles.

23. The heat exchanger as recited in claim 15, wherein the shield style baffles are formed by cutting two diametrically opposed windows into a baffle plate.

24. The heat exchanger as recited in claim 15, wherein the wing style baffles are formed by cutting a single window into a baffle plate.

25. The heat exchanger as recited in claim 15, wherein the donut style baffles are formed by cutting a circular window into a baffle plate.

26. A shell and tube heat exchanger comprising:
an elongated cylindrical shell that defines a longitudinal axis for the heat exchanger and an internal chamber, the shell having two diametrically opposed feed gas inlets and at least one feed gas outlet formed in an outer wall for allowing a feed gas to enter and exit the internal chamber;
at least one tube sheet associated with an end of the elongated shell;
a plurality of circular baffles longitudinally spaced apart within the internal chamber of the shell for redirecting feed gas flow within the internal chamber, the plurality of baffles including a flexible circumferential seal extending towards the shell;
a tube bundle which includes a plurality of tubes for allowing effluent gas to traverse from an inlet plenum through the internal chamber of the shell to an outlet plenum; and
a first cylindrical shroud distributor arranged and configured to direct feed gas flow from the two diametrically opposed feed gas inlets into the internal chamber proximate the at least one tube sheet, the first shroud distributor having a cylindrical outer surface parallel to the longitudinal axis of the cylindrical shell and an upstream edge that is angled obliquely relative to the longitudinal axis for distributing the flow of feed gas wherein the upstream edge is disposed symmetrically across a plane bisecting the cylindrical shell evenly between the two diametrically opposed feed gas inlets.

27. The heat exchanger as recited in claim 21, wherein separate flexible elements are provided on both sides of each of the plurality of circular baffles longitudinally spaced apart within the internal chamber of the shell.

28. The heat exchanger as recited in claim 21, wherein the flexible element of each circumferential seal of each of the plurality of circular baffles is made from stainless steel.

\* \* \* \* \*